United States Patent
Kumagae

(10) Patent No.: US 10,337,446 B2
(45) Date of Patent: Jul. 2, 2019

(54) CONTROL DEVICE FOR INTERNAL COMBUSTION ENGINE

(71) Applicant: Toyota Jidosha Kabushiki Kaisha, Toyota-shi Aichi-ken (JP)

(72) Inventor: Koji Kumagae, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 168 days.

(21) Appl. No.: 15/644,865

(22) Filed: Jul. 10, 2017

(65) Prior Publication Data
US 2018/0017011 A1  Jan. 18, 2018

(30) Foreign Application Priority Data
Jul. 12, 2016 (JP) .................... 2016-137916

(51) Int. Cl.
*F02D 41/40* (2006.01)
*F02D 35/02* (2006.01)
(Continued)

(52) U.S. Cl.
CPC ............. *F02D 41/40* (2013.01); *F02B 11/00* (2013.01); *F02D 13/0211* (2013.01); *F02D 35/025* (2013.01); *F02D 35/026* (2013.01); *F02D 41/3041* (2013.01); *F02D 41/3076* (2013.01); *F02D 41/3094* (2013.01); *F02B 1/12* (2013.01); *F02D 13/0238* (2013.01);
(Continued)

(58) Field of Classification Search
CPC ...... F02D 13/02; F02D 13/0211; F02D 35/02; F02D 35/025; F02D 35/026; F02D 41/30; F02D 41/3076; F02D 41/3041; F02D 41/3094; F02D 41/38; F02D 41/40; F02D 2041/389; F02B 11/00
USPC .............. 123/294–301, 305, 406.11, 406.45; 701/101–105
See application file for complete search history.

(56) References Cited

U.S. PATENT DOCUMENTS 5,785,031 A   7/1998 Akimoto et al.
6,267,097 B1  7/2001 Urushihara et al.
(Continued)

FOREIGN PATENT DOCUMENTS

JP   H1030468 A    2/1998
JP   2000-320333 A  11/2000
(Continued)

*Primary Examiner* — Hung Q Nguyen
*Assistant Examiner* — Johnny H Hoang
(74) *Attorney, Agent, or Firm* — Dinsmore & Shohl LLP

(57) ABSTRACT

A control device for an internal combustion engine is configured to feed fuel to a combustion chamber in an intake stroke to form a homogeneous premix and make the homogeneous premix burn by flame propagation when a temperature of an engine body is less than a first threshold value, to feed fuel to the combustion chamber in the intake stroke to form a homogeneous premix and make the homogeneous premix burn by compression ignition when the temperature of the engine body is the first threshold value to less than a second threshold value larger than the first threshold value, and to directly feed fuel to the combustion chamber in a compression stroke to form a partial premix and make the partial premix burn by compression ignition when the temperature of the engine body is the second threshold value or more.

9 Claims, 9 Drawing Sheets

(51) Int. Cl.
*F02D 41/30* (2006.01)
*F02D 13/02* (2006.01)
*F02B 11/00* (2006.01)
F02D 41/38 (2006.01)
F02B 1/12 (2006.01)
F02M 26/05 (2016.01)
F02M 26/01 (2016.01)

(52) U.S. Cl.
CPC .... *F02D 13/0273* (2013.01); *F02D 2041/389* (2013.01); *F02D 2200/021* (2013.01); *F02M 26/01* (2016.02); *F02M 26/05* (2016.02); *Y02T 10/18* (2013.01); *Y02T 10/44* (2013.01)

(56) References Cited

U.S. PATENT DOCUMENTS

| | | | | |
|---|---|---|---|---|
| 2007/0068466 | A1* | 3/2007 | Kulzer | F02B 1/06 123/3 |
| 2007/0157901 | A1* | 7/2007 | Caine | F01L 1/25 123/302 |
| 2013/0104840 | A1* | 5/2013 | Inoue | F02D 13/0276 123/294 |
| 2014/0060493 | A1* | 3/2014 | Iwai | F02B 23/101 123/478 |
| 2014/0069382 | A1 | 3/2014 | Iwai et al. | |
| 2015/0107550 | A1* | 4/2015 | Remele | F02D 41/3047 123/304 |
| 2016/0069291 | A1* | 3/2016 | Ge | F02D 41/3035 701/103 |
| 2017/0058817 | A1* | 3/2017 | Tsumura | F02D 41/008 |

FOREIGN PATENT DOCUMENTS

| | | |
|---|---|---|
| JP | 2003-129848 A | 5/2003 |
| JP | 2012-241590 A | 12/2012 |
| JP | 2014-051927 | 3/2014 |

* cited by examiner

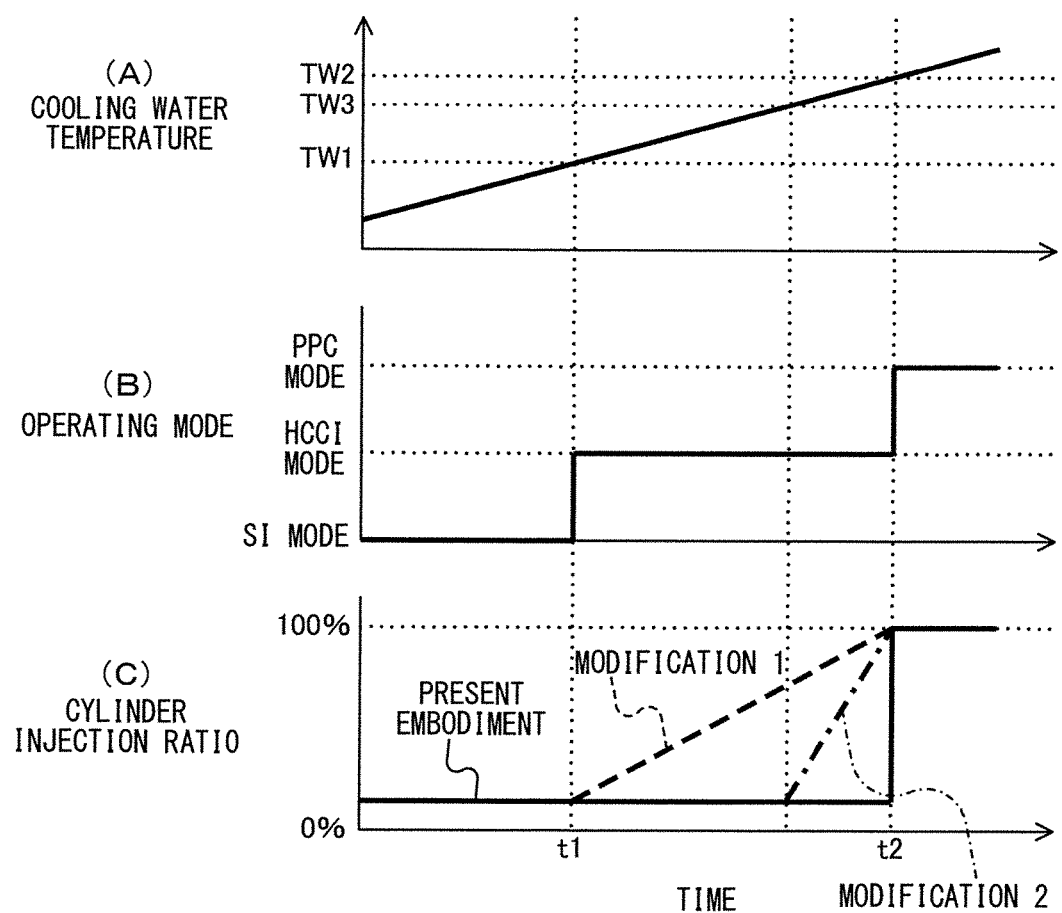

CONTROL DEVICE FOR INTERNAL COMBUSTION ENGINE

CROSS-REFERENCE TO RELATED APPLICATION

This application claims priority based on Japanese Patent Application No. 2016-137916 filed with the Japan Patent Office on Jul. 12, 2016, the entire contents of which are incorporated into the present specification by reference.

TECHNICAL FIELD

The present disclosure relates to a control device of an internal combustion engine.

BACKGROUND ART

JP2014-51927A discloses as a conventional control device of an internal combustion engine a device configured so as to inject fuel into a combustion chamber in a predetermined operating region in a latter half of a compression stroke to make a premix burn by compression ignition and so as to inject fuel in all operating regions in the intake stroke to make the premix burn by flame propagation when the temperature of the engine body is less than a predetermined temperature and it is liable to be unable to stably burn a premix by compression ignition.

SUMMARY OF THE DISCLOSURE

However, even if the temperature of the engine body is a temperature where fuel can be stably burned by compression ignition or more, depending on the temperature of the engine body, sometimes drops of fuel deposited on the inside wall surfaces of a combustion chamber etc. cannot be made to sufficiently evaporate. Therefore, in the above-mentioned conventional control device of an internal combustion engine, when the temperature of the engine body is a temperature where the drops of fuel deposited on the inside wall surfaces of the combustion chamber etc. cannot be made to sufficiently evaporate, sometimes fuel is injected into the combustion chamber in the latter half of the compression stroke.

If injecting fuel into a combustion chamber in the latter half of a compression stroke where the cylinder pressure becomes relatively high, it is necessary to raise the injection pressure to raise the spray penetration force, so fuel easily deposits as drops of fuel at the inside wall surfaces of the combustion chamber etc. If burning the fuel in the state with drops of fuel deposited on the inside wall surfaces of the combustion chamber etc. as they are, particulate matter (below, referred to as "PM") is produced as sources for formation of drops of fuel, so the number of particles of PM in the exhaust (PN) increases and the exhaust emission deteriorates.

Therefore, in the operating region where the above-mentioned conventional control device of an internal combustion engine makes the premix burn by compression ignition, the number of PM in the exhaust increased and the exhaust emission was liable to deteriorate.

The present disclosure was made focusing on this problem and has as its object decreasing the number of PM in the exhaust and suppressing deterioration of the exhaust emission in the operating region where the premix can be made to burn by compression ignition.

To solve this problem, according to one aspect of the present disclosure, there is provided a control device for an internal combustion engine for controlling an internal combustion engine provided with an engine body, a fuel feed system configured to directly feed fuel to at least a combustion chamber of the engine body, a spark plug arranged so as to face the inside of a combustion chamber, and a temperature detector configured to detect a temperature of the engine body, which control device is comprised of a combustion control part configured to burn the premix by controlling the fuel feed system and the spark plug as necessary based on the temperature of the engine body in an operating region enabling a premix to be burned by compression ignition inside the combustion chamber. The combustion control part is configured to feed fuel to the combustion chamber in the intake stroke to form a homogeneous premix and make the homogeneous premix burn by flame propagation when the temperature of the engine body is less than a first threshold value, to feed fuel to the combustion chamber in the intake stroke to form a homogeneous premix and make the homogeneous premix burn by compression ignition when the temperature of the engine body is the first threshold value to less than a second threshold value larger than the first threshold value, and to directly feed fuel to the combustion chamber in the compression stroke to form a partial premix and make the partial premix burn by compression ignition when the temperature of the engine body is the second threshold value or more.

According to this aspect of the present disclosure, in the operating region where the premix can be made to burn by compression ignition, it is possible to reduce the number of PM in the exhaust to suppress deterioration of the exhaust emission.

BRIEF DESCRIPTION OF DRAWINGS

FIG. 11 is a time chart explaining the operation of control for switching an operating mode according to the second embodiment of the present disclosure.

DESCRIPTION OF EMBODIMENTS

Figure 1:
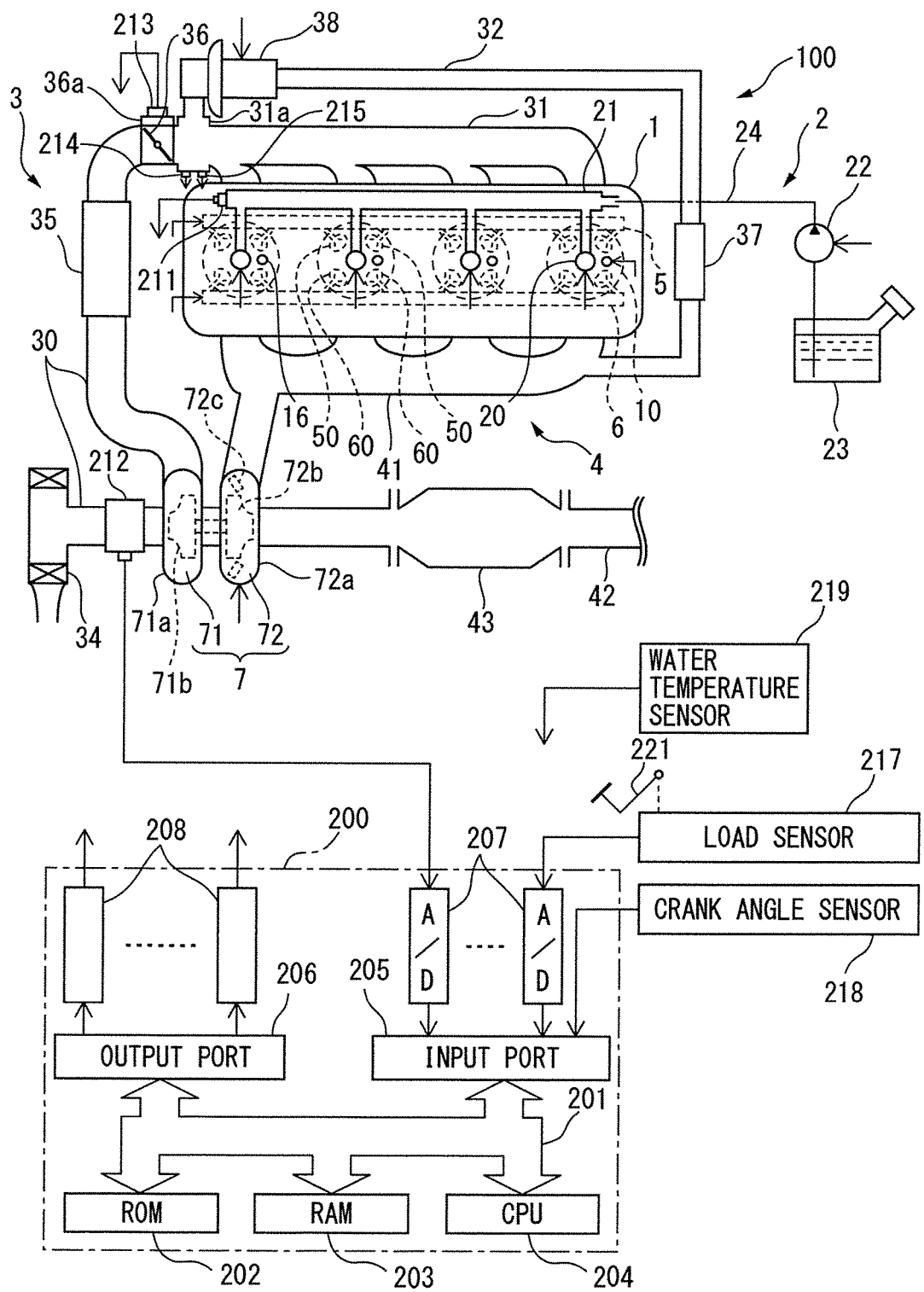
FIG. 1 is a view of the schematic configuration of an internal combustion engine and an electronic control unit controlling an internal combustion engine according to a first embodiment of the present disclosure.

Below, referring to the drawings, embodiments of the present disclosure will be explained in detail. Note that, in the following explanation, similar components will be assigned the same reference numerals.

First Embodiment

Figure 2:
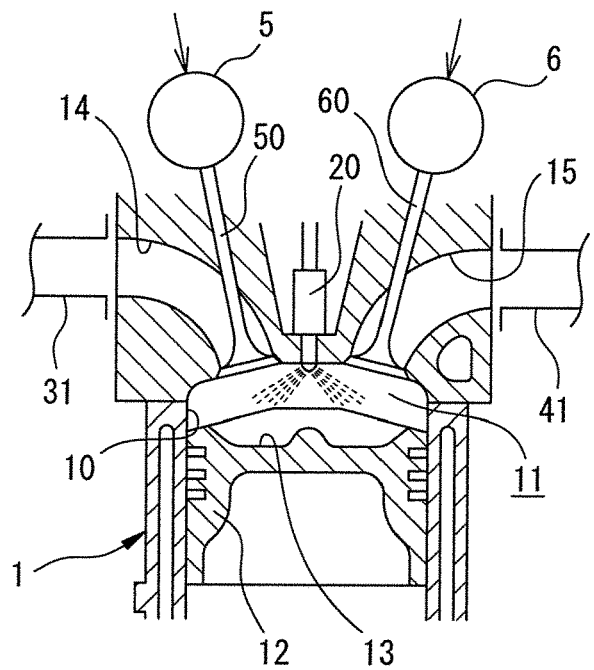
FIG. 2 is a cross-sectional view of an engine body of the internal combustion engine according to the first embodiment of the present disclosure.

FIG. 1 is a view of the general configuration of an internal combustion engine 100 and an electronic control unit 200 controlling the internal combustion engine 100 according to a first embodiment of the present disclosure. FIG. 2 is a cross-sectional view of an engine body 1 of the internal combustion engine 100 according to the present embodiment.

As shown in FIG. 1, the internal combustion engine 100 comprises an engine body 1 provided with a plurality of cylinders 10, a fuel feed system 2, an intake device 3, an exhaust device 4, an intake valve operating device 5, and an exhaust valve operating device 6.

The engine body 1 burns fuel in combustion chambers 11 formed at the cylinders 10 (see FIG. 2) to for example generate drive force for driving a vehicle etc. The engine body 1 is provided with one spark plug 16 for each cylinder facing the combustion chamber 11 of each cylinder 10. Further, the engine body 1 is provided with a pair of intake valves 50 and a pair of exhaust valves 60 for each cylinder.

The fuel feed system 2 is provided with electronically controlled cylinder fuel injectors 20, a delivery pipe 21, feed pump 22, fuel tank 23, and pumping pipe 24.

Each cylinder fuel injector 20 is provided at the engine body 1 so as to be able to inject fuel toward a cavity 13 formed at a top surface of a piston 12 moving back and forth through an inside of a cylinder 10 by receiving the combustion pressure so as to form a partial premix. In the present embodiment, the cylinder fuel injector 20 is arranged adjoining a spark plug 16. One is provided at each cylinder 10 so as to face the combustion chamber 11 of the cylinder 10. The opening time (injection amount) and opening timing (injection timing) of the cylinder fuel injector 20 are changed by control signals from the electronic control unit 200. If the cylinder fuel injector 20 is opened, fuel is directly injected from the cylinder fuel injector 20 to the inside of the combustion chamber 11.

The delivery pipe 21 is connected through the pumping pipe 24 to the fuel tank 23. In the middle of the pumping pipe 24, a feed pump 22 is provided to pressurize the fuel stored in the fuel tank 23 and supply it to the delivery pipe 21. The delivery pipe 21 temporarily stores high pressure fuel pumped from the feed pump 22. If the cylinder fuel injector 20 is opened, high pressure fuel stored in the delivery pipe 21 is directly injected from the cylinder fuel injector 20 to the inside of the combustion chamber 11. The delivery pipe 21 is provided with a fuel pressure sensor 211 for detecting the fuel pressure inside the delivery pipe 21, that is, the pressure of the fuel injected from the cylinder fuel injector 20 to the inside of the cylinder (injection pressure).

The feed pump 22 is configured to be able to change the amount of discharge. The amount of discharge of the feed pump 22 is changed by a control signal from the electronic control unit 200. By controlling the amount of discharge of the feed pump 22, the fuel pressure inside the delivery pipe 21, that is, the injection pressure of the cylinder fuel injector 20, is controlled.

The intake device 3 is a device for guiding intake air to the inside of a combustion chamber 11 and is configured to be able to change the state of the intake air sucked into the combustion chamber 11 (intake pressure, intake temperature, amount of EGR (exhaust gas recirculation) gas). The intake device 3 comprises an intake passage 30, intake manifold 31, and EGR passage 32.

The intake passage 30 is connected at one end to an air cleaner 34 and is connected at the other end to an intake collector 31a of the intake manifold 31. At the intake passage 30, in order from the upstream side, an air flowmeter 212, compressor 71 of the exhaust turbocharger 7, intercooler 35, and throttle valve 36 are provided.

The air flowmeter 212 detects the flow rate of air flowing through the inside of the intake passage 30 and finally being taken into a cylinder 10.

The compressor 71 comprises a compressor housing 71a and a compressor wheel 71b arranged inside the compressor housing 71a. The compressor wheel 71b is driven to rotate by a turbine wheel 72b of the exhaust turbocharger 7 attached on the same shaft and compresses and discharges intake air flowing into the compressor housing 71a. At the turbine 72 of the exhaust turbocharger 7, a variable nozzle 72c for controlling the rotational speed of the turbine wheel 72b is provided. By using the variable nozzle 72c to control the rotational speed of the turbine wheel 72b, the pressure of the intake air discharged from inside the compressor housing 71a (supercharging pressure) is controlled.

The intercooler 35 is a heat exchanger for cooling the intake air compressed by the compressor 71 and becoming a high temperature by, for example, running air or cooling water.

The throttle valve 36 changes the passage cross-sectional area of the intake passage 30 to adjust the amount of intake air introduced into the intake manifold 31. The throttle valve 36 is driven to operate by a throttle actuator 36a. The throttle sensor 213 detects its opening degree (throttle opening degree).

The intake manifold 31 is connected to an intake port 14 (see FIG. 2) formed in the engine body 1. The intake air flowing in from the intake passage 30 is evenly distributed to the cylinders 10 through the intake port 14. The intake collector 31a of the intake manifold 31 is provided with an intake pressure sensor 214 for detecting the pressure of the intake air sucked into the cylinders (intake pressure) and an intake temperature sensor 215 for detecting the temperature of the intake air sucked into the cylinders (intake temperature).

The EGR passage 32 is a passage for connecting the exhaust manifold 41 and intake collector 31a of the intake manifold 31 and returning part of the exhaust discharged from each cylinder 10 to the intake collector 31a by the pressure difference. Below, the exhaust flowing into the EGR passage 32 will be called the "EGR gas". By making the EGR gas recirculate to the intake collector 31a and in turn the individual cylinders 10, it is possible to reduce the combustion temperature and keep down the discharge of nitrogen oxides ($NO_x$). In the EGR passage 32, in order from the upstream side, an EGR cooler 37 and EGR valve 38 are provided.

The EGR cooler 37 is a heat exchanger for cooling the EGR gas by, for example, running air or cooling water.

The EGR valve 38 is a solenoid valve enabling continuous or stepwise adjustment of the opening degree. The opening degree is controlled by the electronic control unit 200 in accordance with the engine operating state. By controlling the opening degree of the EGR valve 38, the flow rate of the EGR gas recirculated to the intake collector 31*a* is adjusted.

The exhaust device 4 is a device for discharging exhaust from the cylinders and is comprised of an exhaust manifold 41 and exhaust passage 42.

The exhaust manifold 41 is connected to an exhaust port 15 formed at the engine body 1 and gathers together the exhaust discharged from the cylinders 10 for introduction into the exhaust passage 42.

In the exhaust passage 42, in order from the upstream side, the turbine 72 of the exhaust turbocharger 7 and an exhaust post-treatment device 43 are provided.

The turbine 72 is provided with a turbine housing 72*a* and a turbine wheel 72*b* arranged inside the turbine housing 72*a*. The turbine wheel 72*b* is driven to rotate by the energy of the exhaust flowing into the turbine housing 72*a* and drives a compressor wheel 71*b* attached on the same shaft.

At the outside of the turbine wheel 72*b*, the above-mentioned variable nozzle 72*c* is provided. The variable nozzle 72*c* functions as a throttle valve. The nozzle opening degree (valve opening degree) of the variable nozzle 72*c* is controlled by the electronic control unit 200. By changing the nozzle opening degree of the variable nozzle 72*c*, it is possible to change the flow rate of exhaust driving the turbine wheel 72*b* inside the turbine housing 72*a*. That is, by changing the nozzle opening degree of the variable nozzle 72*c*, it is possible to change the rotational speed of the turbine wheel 72*b* to change the supercharging pressure. Specifically, if reducing the nozzle opening degree of the variable nozzle 72*c* (throttling the variable nozzle 72*c*), the flow rate of the exhaust rises, the rotational speed of the turbine wheel 72*b* increases, and the supercharging pressure increases.

The exhaust post treatment device 43 is a device for cleaning the exhaust, then discharging it into the outside air and is provided with various types of exhaust purification catalysts for removing harmful substances, filters for trapping harmful substances, etc.

The intake valve operating device 5 is a device for driving operation of the intake valve 50 of each cylinder 10 and is provided at the engine body 1. The intake valve operating device 5 according to the present embodiment is configured to for example drive operation of the intake valve 50 by an electromagnetic actuator so as to enable control of the operating timing of the intake valve 50 to any timing. However, the device is not limited to this. It is also possible to configure it to drive operation of the intake valve 50 by the intake camshaft and provide a variable valve operating mechanism at one end part of the intake camshaft to control the oil pressure and thereby change the relative phase angle of the intake camshaft with respect to the crankshaft and enable the operating timing of the intake valve 50 to be controlled to any timing.

The exhaust valve operating device 6 is a device for driving operation of the exhaust valve 60 of each cylinder 10 and is provided at the engine body 1. The exhaust valve operating device 6 according to the present embodiment is configured so as to make the exhaust valve 60 of the each cylinder 10 open during the exhaust stroke and to enable opening even during the intake stroke in accordance with need. In the present embodiment, as such an exhaust valve operating device 6, an electromagnetic actuator controlled by the electronic control unit 200 is employed. By driving operation of the exhaust valve 60 of each cylinder 10 by an electromagnetic actuator, the operating timing and lift of the exhaust valve 60 are controlled to any timing and lift. Note that, the exhaust valve operating device 6 is not limited to an electromagnetic actuator. For example, it is also possible to employ a valve operating device changing the operating time or lift of an exhaust valve 60 by changing the cam profile by oil pressure etc.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

The input port 205 receives as input the output signals of the above-mentioned fuel pressure sensor 211 etc. through corresponding AD converters 207. Further, the input port 205 receives as input an output voltage of a load sensor 217 generating an output voltage proportional to the amount of depression of an accelerator pedal 221 (below, referred to as the "amount of accelerator depression") through a corresponding AD converter 207 as a signal for detecting the engine load. Further, the input port 205 receives as input an output signal of a crank angle sensor 218 generating an output pulse every time the crankshaft of the engine body 1 rotates by for example 15° as a signal for calculating the engine speed etc. Furthermore, the input port 205 receives as input an output signal of a water temperature sensor 219 detecting the temperature of cooling water cooling the engine body 1 (below, referred to as the "cooling water temperature") through a corresponding AD converter 207 as a signal for detecting the temperature of the engine body 1. Note that, the signal for detecting the temperature of the engine body 1 is not limited to the output signal of the water temperature sensor 219. For example, when providing an oil temperature sensor for detecting the temperature of the lubrication oil lubricating the frictional sliding parts of the engine body 1, the output signal of the oil temperature sensor may also be used. In this way, the input port 205 receives as input the output signals of the various sensors required for controlling the internal combustion engine 100.

The output port 206 is connected through corresponding drive circuits 208 to the cylinder fuel injectors 20 and other control parts.

The electronic control unit 200 outputs control signals for controlling the various controlled parts from the output port 206 to control the internal combustion engine 100 based on the output signals of the various types of sensors input to the input port 205. Below, the control of the internal combustion engine 100 performed by the electronic control unit 200 will be explained.

Figure 3:
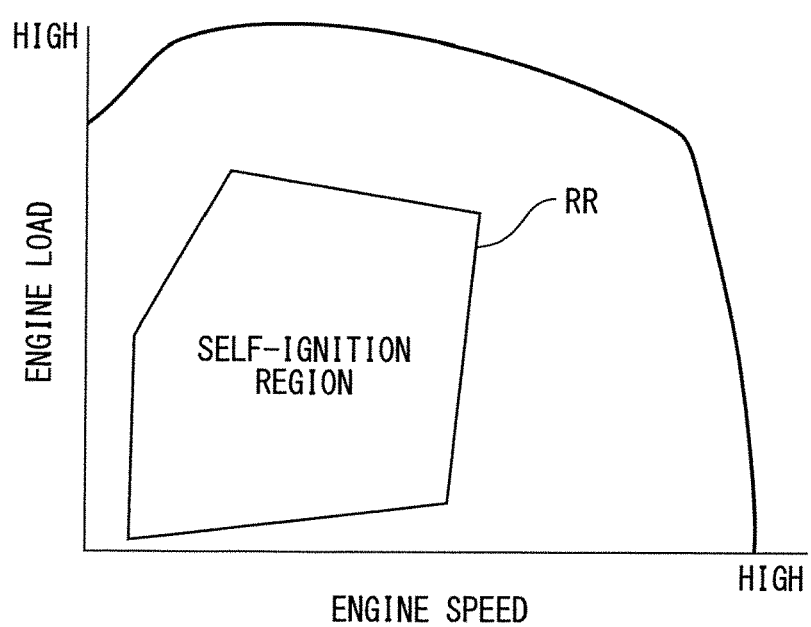
FIG. 3 is a view showing operating regions of an engine body.

The electronic control unit 200 switches the operating mode of the engine body 1 among a spark ignition mode (below, referred to as the "SI mode"), homogenous charge compression ignition mode (below, referred to as the "HCCI mode"), or partially premixed combustion mode (below, referred to as the "PPC mode") in accordance with the temperature of the engine body 1 (in the present embodiment, the cooling water temperature TW) when the engine operating state is in the self-ignition region RR surrounded by the solid lines in FIG. 3. Further, the electronic control unit 200 switches the operating mode of the engine body 1 to the SI mode regardless of the temperature of the engine body 1 when the engine operating state is outside the self-ignition region RR. Further, the electronic control unit 200 performs combustion control corresponding to the different operating modes, that is, controls the fuel feed system 2 and, in accordance with need, performs control to control the spark plug 16 to make the premix burn.

Specifically, the electronic control unit 200 basically injects fuel during the intake stroke (for example 300° BTDC to 200° BTDC) to form a homogeneous premix of the stoichiometric air-fuel ratio or near the stoichiometric air-fuel ratio in the combustion chamber 11 when the operating mode is the SI mode. Further, the electronic control unit 200 ignites this homogeneous premix by a spark plug 16 at the optimal ignition timing (knock limit timing when optimal ignition timing is at advanced side from knock limit ignition timing) so as to make it burn by flame propagation and thereby operate the engine body 1.

Further, when the operating mode is the HCCI mode, the electronic control unit 200 basically injects fuel during the intake stroke (for example, 300° BTDC to 200° BTDC) into the combustion chamber 11 so as to form a homogeneous premix with an air-fuel ratio leaner than the stoichiometric air-fuel ratio (for example 30 to 40 or so) and makes the homogeneous premix burn by compression ignition to operate the engine body 1.

Further, when the operating mode is the PCC mode, the electronic control unit 200 basically injects fuel during the second half of the compression stroke (for example, 90° BTDC to 0° BTDC) to form a partial premix of an air-fuel ratio (for example 30 to 40 or so) leaner than the stoichiometric air-fuel ratio, having a combustible layer at the center part in the combustion chamber 11, and having an air layer around the inside wall surface of the combustion chamber 11 and makes the partial premix burn by compression ignition to operate the engine body 1. In the following explanation, when not necessary to particularly differentiate between a homogeneous premix and partial premix, these will be referred to all together as a "premix".

Note that when the operating mode is the PPC mode, the present embodiment utilizes the so-called wall guide method of injecting fuel toward the cavity 13 formed at the top surface of the piston in the second half of the compression stroke and utilizing the cavity 13 to guide fuel to the center part inside the combustion chamber 11 to thereby form a partial premix. However, the method of forming the partial premix is not limited to the wall guide method. For example, the spray guide method or other method may also be used to form a partial premix.

The burning of the premix by compression ignition performed when the operating mode is the HCCI mode and PPC mode can be performed even if making the air-fuel ratio leaner compared with burning of the premix by flame propagation performed when the operating mode is the SI mode. Further, it can be performed even if making the compression ratio higher. For this reason, by burning the premix by compression ignition, it is possible to improve the fuel efficiency and possible to improve the thermal efficiency. Further, burning the premix by compression ignition results in a lower combustion temperature compared with burning by flame propagation, so it is possible to suppress the production of $NO_X$. Furthermore, there is sufficient oxygen present around the fuel, so it is also possible to suppress the production of unburned HC.

Further, the burning of the partial premix by compression ignition performed when the operating mode is the PPC mode can improve the thermal efficiency compared with the burning of the homogeneous premix by compression ignition performed when the operating mode is the HCCI mode. The reason is as follows:

That is, in the HCCI mode, since making a homogeneous premix causing fuel to diffuse throughout the combustion chamber 11 burn by compression ignition, in the expansion stroke, the heat of the combustion gas is easily robbed through the inside wall surfaces of the combustion chamber 11. On the other hand, in the PPC mode, since a partial premix having an air layer around the inside wall surfaces of the combustion chamber 11 is made to burn by compression ignition, in the expansion stroke, contact between the combustion gas and inside wall surfaces of the combustion chamber 11 is obstructed by the air layer. For this reason, at the time of the PPC mode, compared with the HCCI mode, heat of the combustion gas becomes harder to be robbed through the inside wall surfaces of the combustion chamber 11, so it is possible to reduce the cooling loss compared with the HCCI mode. Accordingly, burning a partial premix by compression ignition performed when the operating mode is the PPC mode is improved in thermal efficiency compared with burning a homogeneous premix by compression ignition performed when the operating mode is the HCCI mode.

In this way, if comparing the thermal efficiencies when operating the engine body 1 in the different operating modes, operating the engine body 1 in the PPC mode becomes the best, while operating it in the SI mode becomes the worst. For this reason, if trying to produce the same output torque at the different operating modes, the amount of fuel required at that time becomes smallest when operating the engine body 1 in the PPC mode and becomes greatest when operating it in the SI mode. That is, when making the engine body 1 operate in the PPC mode, the fuel efficiency becomes the best.

Note that, to make a premix burn by compression ignition in the combustion chamber 11, it is necessary to make the cylinder temperature rise to a temperature where the premix can be made to self ignite. It is necessary to make the cylinder temperature a higher temperature compared with making the premix burn completely by flame propagation inside the combustion chamber 11 such as in the SI mode. For this reason, in the present embodiment, as shown in for example FIG. 4A and FIG. 4B, during the HCCI mode and PPC mode, the exhaust valve operating device 6 is controlled so that the exhaust valve 60 opens not only in the exhaust stroke, but also the intake stroke. In this way, by performing an exhaust valve double opening operation again opening the exhaust valve 60 during the intake stroke, it is possible to suck back the high temperature exhaust discharged from a cylinder during the exhaust stroke into the original cylinder during the immediately succeeding intake stroke. The cylinder temperature is made to rise to maintain the cylinder temperature in the cylinder 10 at a temperature enabling combustion by compression ignition.

Figure 4A:
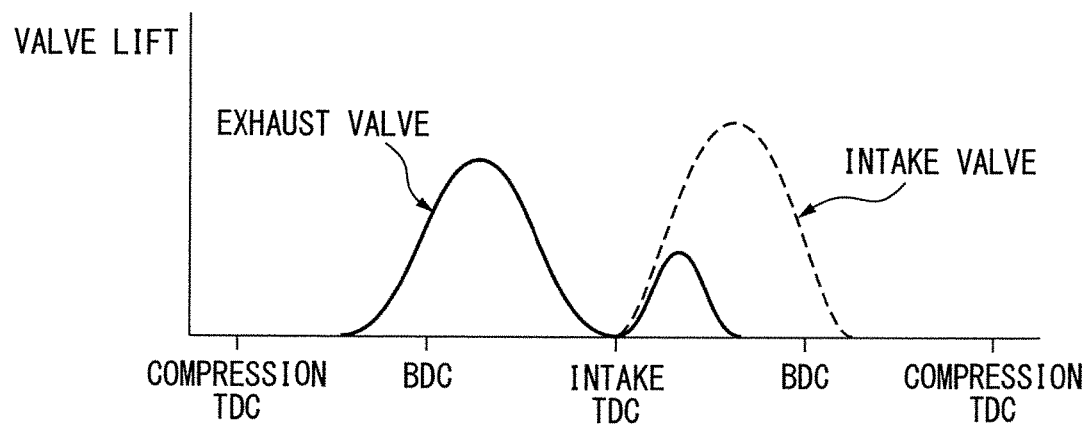
FIG. 4A is a view showing an example of opening operations of an intake valve and exhaust valve in an HCCI mode and PPC mode.
Figure 4B:
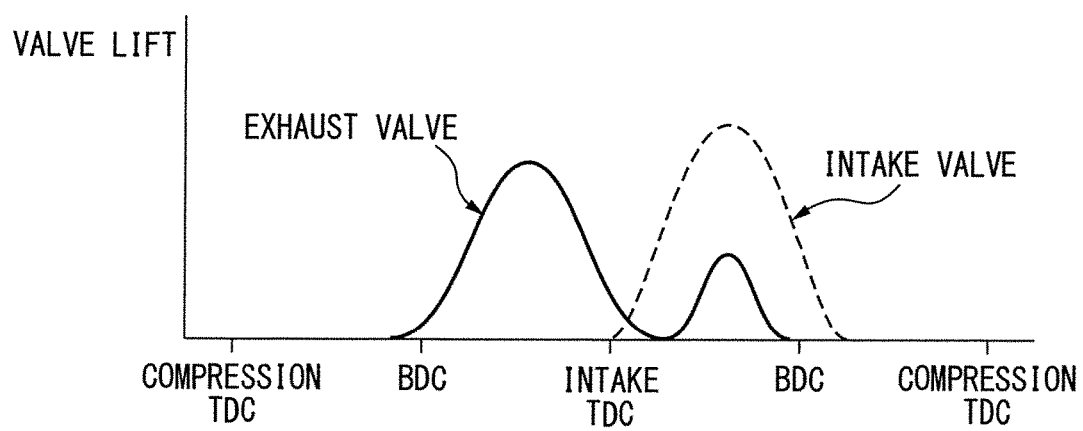
FIG. 4B is a view showing an example of opening operations of an intake valve and exhaust valve in an HCCI mode and PPC mode.

As shown in FIG. 4A, if opening the exhaust valve 60 when the amount of lift of the intake valve 50 is small, a large amount of exhaust can be sucked back into the original cylinder, so it is possible to make the cylinder temperature greatly rise. On the other hand, as shown by FIG. 4B, if opening the exhaust valve 60 after the amount of lift of the intake valve 50 becomes larger to a certain extent, exhaust is sucked back after a certain extent of air (fresh air) is sucked into the cylinder, so it is possible to keep down the amount of exhaust sucked back into the original cylinder to keep down the amount of rise of the cylinder temperature. In this way, it is possible to control the amount of rise of the cylinder temperature in accordance with the timing of performing the exhaust valve double opening operation. In the present embodiment, the ratio of the amount of EGR gas in the amount of cylinder gas and the amount of exhaust sucked back into the original cylinder is called the "EGR rate".

Note that, if making a premix burn by compression ignition in a combustion chamber 11 in the HCCI mode and PPC mode, by assisting ignition of the premix by the spark plug 16 in accordance with need to make part of the fuel burn by flame propagation and using the heat generated at that time to forcibly make the cylinder temperature rise, it is possible to make the remaining fuel burn by compression ignition. By assisting ignition in this way to make the premix burn by compression ignition, even if the cylinder temperature is relatively low, it becomes possible to make the premix burn by compression ignition and it becomes easy to control the ignition timing of the premix to any timing.

Here, in the present embodiment, as explained above, when the engine operating state is in the self-ignition region RR, the operating mode of the engine body 1 is switched to either of the SI mode, HCCI mode, or PPC mode in accordance with the temperature of the engine body 1 (in the present embodiment, the cooling water temperature TW).

As explained above, by making a premix burn by compression ignition, compared with when making it burn by spark ignition, it is possible to improve the fuel efficiency and possible to improve the thermal efficiency. Further, the production of $NO_X$ and unburned HC can be suppressed. For this reason, when the engine operating state is in the self-ignition region RR, in some embodiments the premix is made to burn by compression ignition to operate the engine body 1 as much as possible.

However, when the temperature of the engine body 1 is low, compared with when the temperature of the engine body 1 is high, the heat flux to the inside of the engine body from the inside wall surfaces of a combustion chamber 11 increases. That is, when the temperature of the engine body 1 is low, compared to when the temperature of the engine body 1 is high, the heat loss of the wall surfaces during the compression stroke increases, so it is liable to become unable to make the cylinder temperature rise to a temperature enabling the premix to be made to burn by compression ignition. Therefore, when the temperature of the engine body 1 is low, if making the premix burn by compression ignition to operate the engine body 1, combustion is liable to become unstable.

Therefore, in the present embodiment, when the cooling water temperature TW, which is in a correlative relationship with the temperature of the engine body 1, is less than the first threshold value TW1 (° C.), even if the engine operating state is in the self-ignition region RR, the operating mode is switched to the SI mode to make the premix burn by flame propagation and operate the engine body 1. Due to this, the stability of the combustion when the temperature of the engine body 1 is low can be secured.

Further, as explained above, when making the premix burn by compression ignition, forming a partial premix and making it burn by compression ignition enables improvement of the thermal efficiency compared when forming a homogeneous premix and making it burn by compression ignition. Therefore, in some embodiments the operating mode is switched to the PPC mode to make the partial premix burn by compression ignition so as to operate the engine body 1 when the engine operating state is in the self-ignition region RR after the cooling water temperature TW becomes the first threshold value TW1 or more.

However, in the PPC mode, fuel is injected in the second half of the compression stroke where the cylinder pressure becomes relatively high, so it is necessary to raise the injection pressure to raise the spray penetration force. For this reason, the fuel injected from the cylinder fuel injector 20 easily deposits as drops of fuel on the inside wall surface of the combustion chamber 11. In particular, when, like in the present embodiment, the cavity 13 formed at the top surface of the piston is utilized to form a partial premix, quite a bit of drops of fuel deposit on the top surface of the piston.

The drops of fuel deposited on the inside wall surfaces of the combustion chamber 11 and the top surface of the piston evaporate if the cooling water temperature TW is the second threshold value TW2 (° C.) or more, that is, if the temperature of the engine body 1 is a certain temperature or more, but do not evaporate if the cooling water temperature TW is less than the second threshold value TW2 and remain deposited on the inside wall surfaces of the combustion chamber 11 and the top surface of the piston. If fuel is burned in the combustion chamber 11 in the state with drops of fuel remaining deposited on the inside wall surfaces of the combustion chamber 11 and the top surface of the piston, PM is generated using the drops of fuel as the source. Therefore, the more the drops of fuel increase, the more the PN of the number of PM in the exhaust increases and the more the exhaust emission deteriorates. Further, the second threshold value TW2 basically becomes higher than the first threshold value TW1 although depending on the specifications of the internal combustion engine 100.

Therefore, in the present embodiment, after the cooling water temperature TW becomes the first threshold value TW1 or more and the temperature of the engine body 1 becomes higher by a certain degree, the operating mode is switched to the HCCI mode until the cooling water temperature TW becomes the second threshold value TW2. The operating mode is switched to the PPC mode after the cooling water temperature TW becomes the second threshold value TW2 or more.

In the HCCI mode, fuel is injected during the intake stroke, so it is possible to lower the injection pressure compared with the PPC mode. Further, the cavity 13 is not utilized either. For this reason, compared with the PPC mode, the ratio of the fuel deposited as drops of fuel at the inside wall surfaces of the combustion chamber 11 etc. in the fuel injected from the cylinder fuel injector 20 can be reduced. Therefore, by making the operating mode the HCCI mode like in the present embodiment in the period when the cooling water temperature TW is the first threshold value TW1 to the second threshold value TW2, compared with when making the operating mode the PPC mode, it is possible to reduce the PN in the exhaust and possible to suppress deterioration of the exhaust emission.

Below, the control for switching the operating mode according to the present embodiment which the electronic control unit 200 performs will be explained.

Figure 5:
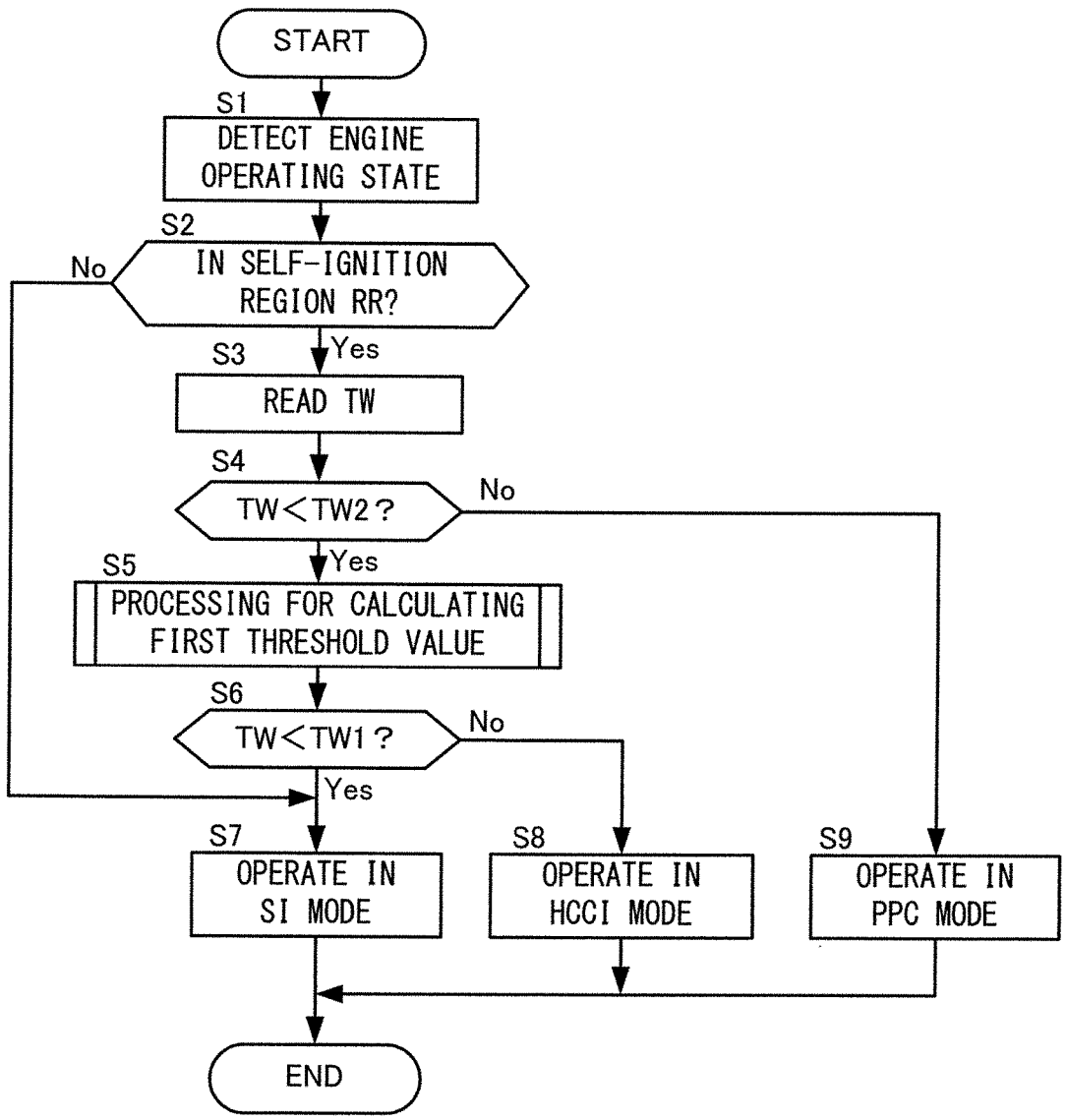
FIG. 5 is a flow chart explaining control for switching an operating mode according to the first embodiment of the present disclosure.

FIG. 5 is a flow chart explaining control for switching the operating mode according to the present embodiment. The electronic control unit 200 repeatedly performs this routine during engine operation by a predetermined processing period.

At step S1, the electronic control unit 200 reads the engine load detected by the load sensor 217 and engine speed calculated based on the output signal of the crank angle sensor 218 to detect the engine operating state.

At step S2, the electronic control unit 200 judges if the engine operating state is in the self-ignition region RR. The electronic control unit 200 proceeds to step S3 if the engine operating state is in the self-ignition region RR. On the other hand, the electronic control unit 200 proceeds to step S7 if the engine operating state is outside the self-ignition region RR.

At step S3, the electronic control unit 200 reads the cooling water temperature TW detected by the water temperature sensor 219.

At step S4, the electronic control unit 200 judges if the cooling water temperature TW is less than the second threshold value TW2. The second threshold value TW2 is a threshold value at which the drops of fuel deposited on the inside wall surfaces of the combustion chamber 11 and the top surface of the piston evaporate. Therefore, the second threshold value TW2 basically can be made a fixed value (for example, value of 50° C. to 70° C. or so) corresponding to the specifications of the internal combustion engine 100. The electronic control unit 200 proceeds to step S5 if the cooling water temperature TW is less than the second threshold value TW2. On the other hand, the electronic control unit 200 proceeds to step S9 if the cooling water temperature TW is the second threshold value TW2 or more.

At step S5, the electronic control unit 200 performs the processing for calculating a first threshold value for calculating the first threshold value TW1. In the present embodiment, it calculates the estimated value of the cylinder temperature $T_{TDC}$ at compression top dead center in the case assuming the premix is adiabatically compressed in the cylinder (below, referred to as the "adiabatic compression end temperature") and calculates the first threshold value TW1 based on this adiabatic compression end temperature $T_{TDC}$.

Whether the premix can be made to burn by compression ignition is basically determined by whether it is possible to make the cylinder temperature rise to a temperature where the premix can be made to burn by compression ignition. The actual cylinder temperature in the compression stroke becomes higher the higher the adiabatic compression end temperature $T_{TDC}$ even if the cooling water temperature TW is the same. That is, the higher the adiabatic compression end temperature $T_{TDC}$, even if the cooling water temperature TW is low, it is possible to raise the cylinder temperature to a temperature where the premix can be made to burn by compression ignition. Therefore, in the present embodiment, the minimum value of the cooling water temperature TW enabling the premix to burn by compression ignition for each adiabatic compression end temperature $T_{TDC}$ (that is, the first threshold value TW1) is found in advance by experiments etc. The first threshold value TW1 is calculated based on the adiabatic compression end temperature $T_{TDC}$. Below, the detailed content of processing for calculating a first threshold value will be explained referring to the flow chart of FIG. 6.

Figure 6:
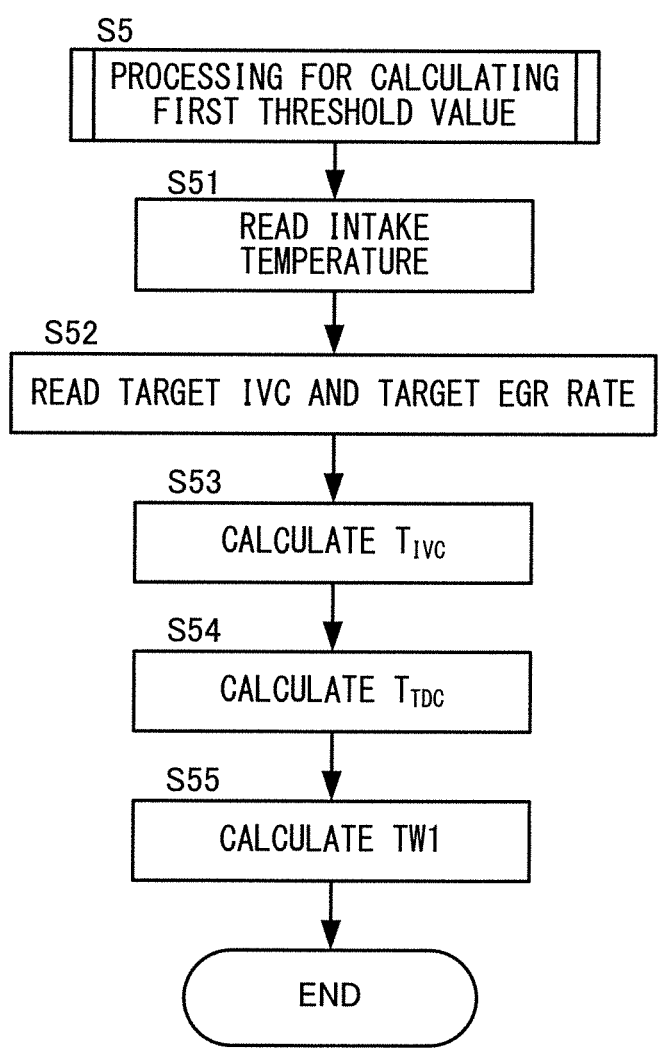
FIG. 6 is a flow chart explaining content of processing for calculating a first threshold value.

FIG. 6 is a flow chart explaining the content of processing for calculating the first threshold value.

At step S51, the electronic control unit 200 reads the intake temperature detected based on the intake temperature sensor 215.

At step S52, the electronic control unit 200 reads the target intake valve closing timing (below, referred to as the "target IVC") and target EGR rate for the time when the operating mode is the HCCI mode based on the engine operating state.

Figure 7:
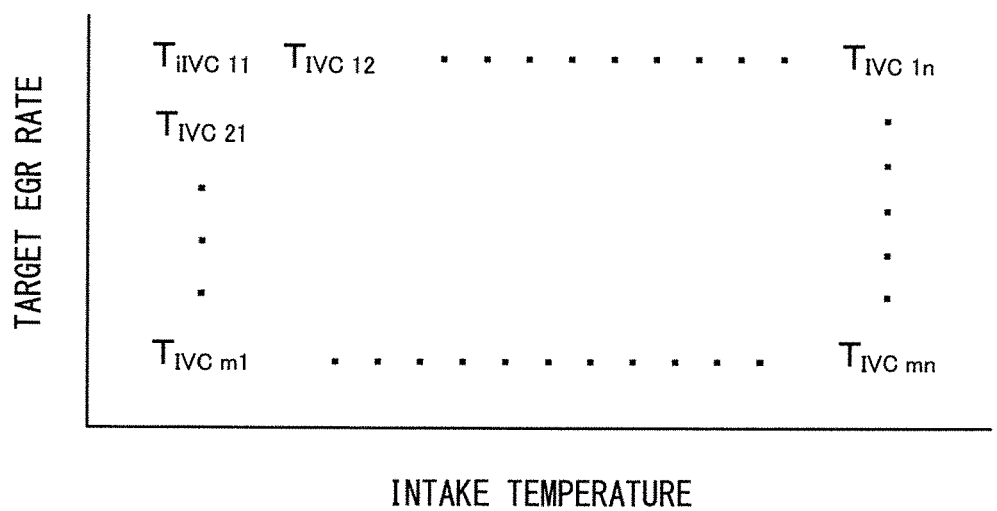
FIG. 7 is a map for calculating an initial cylinder temperature $T_{IVC}$ based on an intake temperature and target EGR rate.

At step S53, the electronic control unit 200 calculates the estimated value of the cylinder temperature $T_{IVC}$ at the target IVC (below, referred to as the "initial cylinder temperature"). The initial cylinder temperature $T_{IVC}$ is correlated with the intake temperature and the target EGR rate (in the HCCI mode, basically the amount of exhaust sucked back into the original cylinder). Specifically, the initial cylinder temperature $T_{IVC}$ tends to become higher the higher the intake temperature, further, the higher the target EGR rate. Therefore, in the present embodiment, the map of FIG. 7 linking the intake temperature and target EGR rate and the initial cylinder temperature $T_{IVC}$ is prepared in advance by experiments etc. and the map is referred to so as to calculate the initial cylinder temperature $T_{IVC}$ based on the intake temperature and target EGR rate.

At step S54, the electronic control unit 200 calculates the adiabatic compression end temperature $T_{TDC}$. In the present embodiment, the electronic control unit 200 calculates the adiabatic compression end temperature $T_{TDC}$ based on the initial cylinder temperature $T_{IVC}$ from the following formula (1) for estimation of the cylinder temperature T when assuming the premix is adiabatically compressed:

$$T_{TDC} = T_{IVC} \times (V_{IVC}/V_{TDC})^{k-1} \quad (1)$$

In formula (1), $V_{IVC}$ is the combustion chamber volume at the target IVC. $V_{TDC}$ is the combustion chamber volume at compression top dead center. "k" is the specific heat ratio (polytropic index). The combustion chamber volume $V_{TDC}$ and specific heat ratio "k" are fixed values determined by the specifications of the internal combustion engine 100. On the other hand, the combustion chamber volume $V_{IVC}$ is a variable value fluctuating depending on the target IVC, but is a value determined mechanically if the target IVC is determined. Therefore, in the present embodiment, in calculating the adiabatic compression end temperature $T_{TDC}$, a table linking the target IVC and combustion chamber volume $V_{IVC}$ is prepared in advance by experiments etc. and the table is referred to so as to calculate the combustion chamber volume $V_{IVC}$ based on the target IVC.

Figure 8:
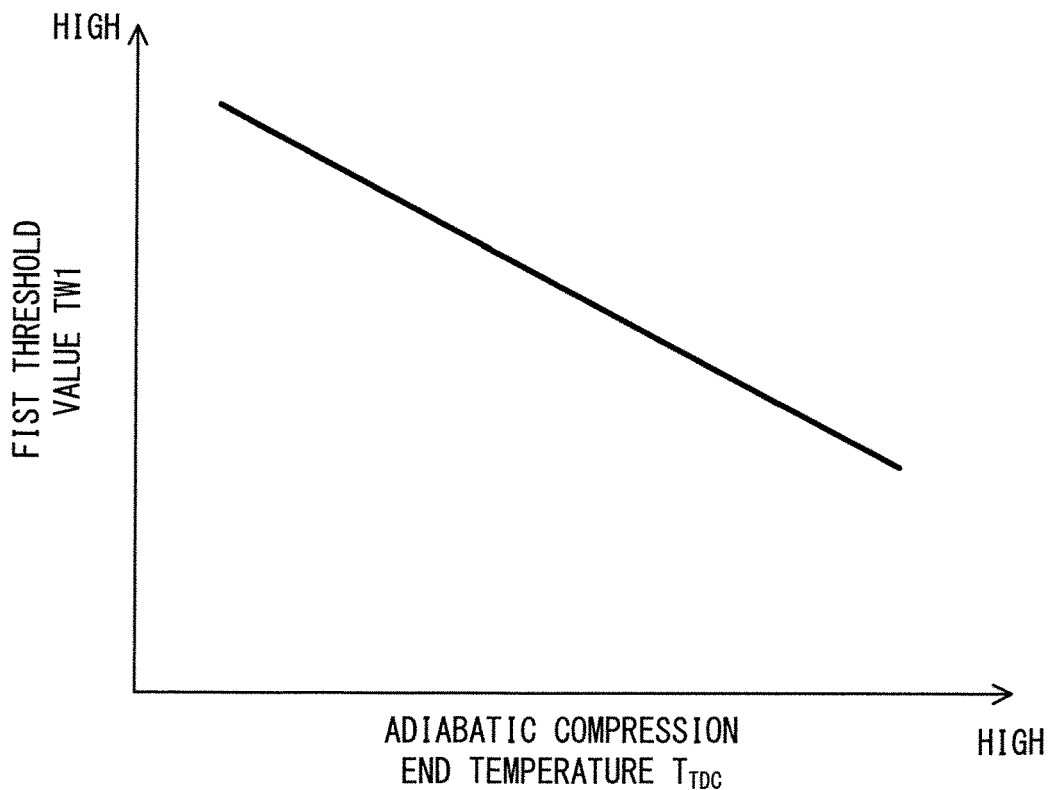
FIG. 8 is a table for calculating a first threshold value TW1 based on an adiabatic compression end temperature $T_{TDC}$.

At step S55, the electronic control unit 200 refers to the table of FIG. 8 to calculate the first threshold value TW1 based on the adiabatic compression end temperature $T_{TDC}$. As shown in the table of FIG. 8, the higher the adiabatic compression end temperature $T_{TDC}$, the lower the first threshold value TW1.

Here, as will be understood from the estimation formula (1), the adiabatic compression end temperature $T_{TDC}$ tends to become higher the higher the initial cylinder temperature $T_{ivc}$ and, further, the higher the actual compression ratio ($=V_{IVC}/V_{TDC}$). Further, the initial cylinder temperature $T_{IVC}$ as explained above tends to become higher the higher the intake temperature and further the higher the target EGR rate. Therefore, the first threshold value TW1 tends to become lower the higher the intake temperature. Further, the first threshold value TW1 tends to become lower the higher the target EGR rate. Furthermore, the first threshold value TW1 tends to become lower the higher the actual compression ratio. Note that in the present embodiment, the first threshold value TW1 becomes a value of about 20° C. to 40° C.

Returning to FIG. 5, at step S6, the electronic control unit 200 judges if the cooling water temperature TW is less than the first threshold value TW1. The electronic control unit 200 proceeds to step S7 if the cooling water temperature TW is less than the first threshold value TW1. On the other hand, the electronic control unit 200 proceeds to step S8 if the cooling water temperature T is the first threshold value T1 or more.

At step S7, the electronic control unit 200 sets the operating mode to the SI mode and causes the homogeneous premix to burn by flame propagation in the above way so as to operate the engine body 1.

At step S8, the electronic control unit 200 sets the operating mode to the HCCI mode and causes the homogeneous premix to burn by compression ignition in the above way so as to operate the engine body 1.

At step S9, the electronic control unit 200 sets the operating mode to the PCC mode and causes the partial premix to burn by compression ignition in the above way so as to operate the engine body 1.

Figure 9:
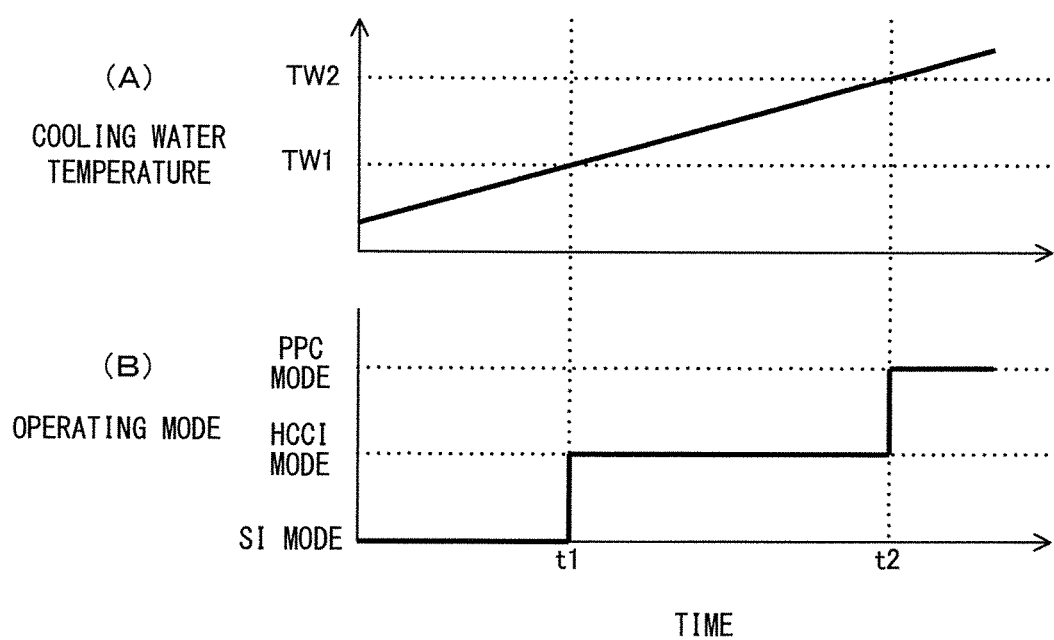
FIG. 9 is a time chart explaining the operation of control for switching an operating mode according to the first embodiment of the present disclosure.

FIG. 9 is a time chart showing one example of the operation of control for switching operating modes according to the present embodiment in the case where the engine operating state is in the self-ignition region RR and, further, is constant.

In the present embodiment, during engine operation, for example, a thermostat etc. is used to control the cooling water temperature TW to a predetermined water temperature higher than the second threshold value TW2. For this reason, as shown in FIG. 9, during engine operation, the cooling water temperature TW gradually increases, but until the time t1, the cooling water temperature TW is less than the first threshold value TW1, so while the engine operating state is in the self-ignition region RR, the operating mode is set to the SI mode.

At the time t1, if the cooling water temperature TW becomes the first threshold value TW1 or more, the operating mode is switched to the HCCI mode. The operating mode is maintained at the HCCI mode until the time t2 where the cooling water temperature TW becomes the second threshold value TW2.

Further, at the time t2, if the cooling water temperature TW becomes the second threshold value TW2 or more, the operating mode is switched to the PPC mode. At the time t2 and on, if during engine operation, the cooling water temperature TW will basically never fall below the second threshold value TW2, so the operating mode is maintained at the PPC mode until the engine operating state becomes outside the self-ignition region RR.

According to the above explained embodiment, an electronic control unit 200 (control device) for controlling an internal combustion engine 100 provided with an engine body 1, a fuel feed system 2 configured so as to be able to directly feed fuel to at least the combustion chambers 11 of the engine body 1, spark plugs 16 arranged so as to approach the combustion chambers 11, and a water temperature sensor 219 (temperature detector) configured to detect the temperature of the engine body 1 is comprised of a combustion control part configured to burn a premix by controlling the fuel feed system and the spark plug as necessary based on the temperature of the engine body in an operating region enabling the premix to be burned by compression ignition inside the combustion chamber.

Further, the combustion control part is configured to feed fuel to a combustion chamber 11 during an intake stroke to form a homogeneous premix and cause the homogeneous premix to burn by flame propagation when the temperature of the engine body 1 is less than the first threshold value TW1, to feed fuel to the combustion chamber 11 during the intake stroke to form a homogeneous premix and cause the homogeneous premix to burn by compression ignition when the temperature of the engine body 1 is the first threshold value TW1 to less than a second threshold value TW2 larger than the first threshold value TW1, and to directly feed fuel to the combustion chamber 11 during the compression stroke to form a partial premix and cause the partial premix to burn by compression ignition when the temperature of the engine body 1 is the second threshold TW2 or more.

Due to this, according to the present embodiment, the engine body 1 is operated in the HCCI mode of feeding fuel into the combustion chamber 11 during the intake stroke to form a homogeneous premix and making the homogeneous premix burn by compression ignition after the cooling water temperature TW used as the temperature of the engine body 1 becomes the first threshold value TW1 or more until the cooling water temperature TW becomes the second threshold value TW2 at which the drops of fuel deposited on the inside wall surfaces of the combustion chamber 11 etc. evaporate.

For this reason, compared with the case of making the engine body 1 operate in the PPC mode in the time period after the cooling water temperature TW becomes the first threshold value TW1 or more until becoming second threshold value TW2, it is possible to decrease the ratio of drops of fuel depositing on the inside wall surfaces of the combustion chamber 11 etc., so it is possible to decrease the PN in the exhaust and, as a result, suppress the deterioration of exhaust emission.

Further, compared with when making the engine body 1 operate in the SI mode in the time period from when the cooling water temperature TW becomes the first threshold value TW1 or more to when it becomes the second threshold value TW2, it is possible to improve the fuel efficiency and it is possible to suppress the generation of NO$_X$ and unburned HC, so it is possible to suppress deterioration of the exhaust emission.

Further, the combustion control part according to the present embodiment is provided with a first threshold value calculation part calculating the first threshold value TW1 based on the adiabatic compression end temperature T$_{TDC}$ of the estimated value of the cylinder temperature at compression top dead center in the case of assuming the premix is adiabatically compressed inside a combustion chamber 11. Further, the first threshold value calculation part is configured to reduce the first threshold value TW1 the higher the adiabatic compression end temperature T$_{TDC}$.

Here, for example, when making the first threshold value TW1 a fixed value, it is necessary to set the first threshold value TW1 at a relatively high value considering operating conditions where the intake temperature or EGR rate is low. As opposed to this, according to the present embodiment, it is possible to precisely calculate the first threshold value TW1 even though it changes depending on the intake temperature or EGR rate and the actual compression ratio. As a result, it is possible to lower the first threshold value TW1. Therefore, when the cooling water temperature TW is less than the second threshold value TW2, it is possible to enlarge the temperature region at which operation in the HCCI mode is possible, so it is possible to further raise the fuel efficiency and possible to suppress the amount of discharge of NO$_X$ or unburned HC to suppress more the deterioration of the exhaust emission.

Second Embodiment

Next, a second embodiment of the present disclosure will be explained. The present embodiment differs from the first embodiment in the point that when the engine operating state is within the self-ignition region RR and the cooling water temperature TW is less than the second threshold value TW2, fuel is injected from a cylinder fuel injector 20 and a later explained port fuel injector 25. Below, the explanation will center on this point of difference.

Figure 10:
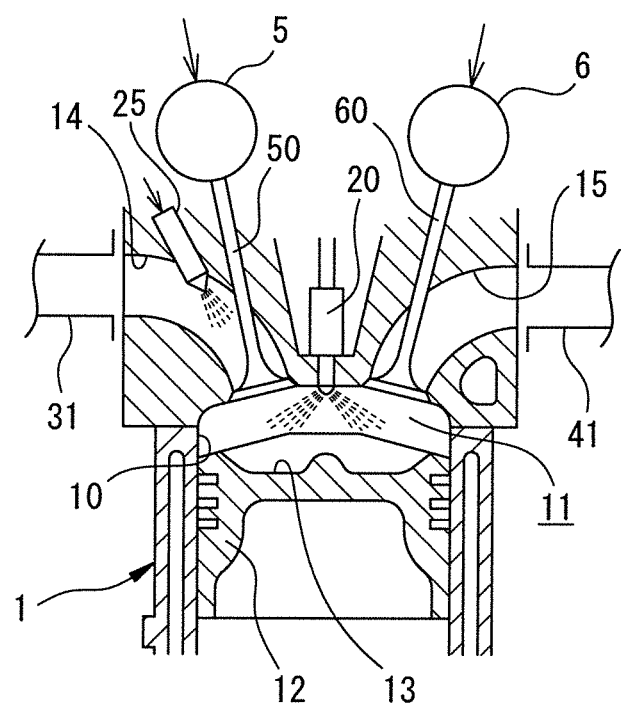
FIG. 10 is a cross-sectional view of an engine body of an internal combustion engine according to a second embodiment of the present disclosure.

FIG. 10 is a cross-sectional view of an engine body 1 of an internal combustion engine 100 according to the present embodiment.

As shown in FIG. 10, the fuel feed system 2 of the internal combustion engine 100 according to the present embodiment is further provided with an electronically controlled port fuel injector 25 for injecting fuel into an intake port 14 to indirectly feed fuel to the inside of the combustion chamber 11. The opening time (injection amount) and opening timing (injection timing) of the port fuel injector 25 are changed by a control signal from the electronic control unit

200. If the port fuel injector 25 opens, fuel is injected from the port fuel injector 25 to the inside of the intake port 14.

In the above-mentioned first embodiment, if the engine operating state was in the self-ignition region RR, when the cooling water temperature TW was less than the first threshold value TW1, the homogeneous premix was made to burn by flame propagation, while if the cooling water temperature TW was the first threshold value TW1 to less than the second threshold value TW2, the homogeneous premix was made to burn by compression ignition.

Here, as explained above, when the cooling water temperature TW is less than the second threshold value TW2, the drops of fuel deposited on the inside wall surfaces of the combustion chamber 11 and the top surface of the piston will mostly remain deposited in the state of drops of fuel without evaporating.

At this time, when forming a homogeneous premix in the combustion chamber 11, compared with the case of injecting the entire target fuel injection amount determined in accordance with the engine load from the cylinder fuel injector 20 during the intake stroke to directly feed it to the inside of the combustion chamber 11, injecting part or all of the target fuel injection amount from the port fuel injector 25 during the intake stroke to indirectly feed it lowers the ratio of the fuel deposited as drops of fuel on the inside wall surfaces of the combustion chamber 11 etc. Therefore, the method of injecting part or all of the target fuel injection amount from the port fuel injector 25 to increase the ratio of fuel indirectly fed to the combustion chamber 11 can reduce the PN in the exhaust.

Therefore, in the present embodiment, the proportional injection ratio between the cylinder fuel injector 20 and the port fuel injector 25 giving the smallest PN in the exhaust (below, referred to as the "optimal proportional injection ratio") is found in advance by experiments etc. for each engine load.

FIG. 11 is a time chart showing one example of the operation of the control for switching operating modes according to the present embodiment in the case where the engine operating state is in the self-ignition region RR and, further, is constant.

As shown in (C) Cylinder Injection Ratio of FIG. 11 by the solid line, if the engine operating state is in the self-ignition region RR, when the cooling water temperature TW is less than the second threshold value TW2, a target fuel injection amount corresponding to the engine load is injected during the intake stroke from the cylinder fuel injector 20 and port fuel injector 25 by the optimal proportional injection ratio.

Due to this, it is possible to reduce the PN in the exhaust even more. Further, in the HCCI mode, by injecting part or all of the target fuel injection amount from the port fuel injector 25 to indirectly feed fuel to the inside of the combustion chamber 11, it is possible to make the fuel vaporize before the fuel is fed to the inside of the combustion chamber 11. Therefore, compared to when directly injecting all of the target fuel injection amount from the cylinder fuel injector 20 to the inside of the combustion chamber 11, the ratio of fuel vaporizing inside the combustion chamber 11 becomes smaller and a fall in cylinder temperature due to the latent heat of vaporization can be suppressed.

For this reason, in the HCCI mode, by injecting part or all of the target fuel injection amount from the port fuel injector 25 and indirectly feeding it to the combustion chamber 11, it is possible to lower the first threshold value TW1 more compared with injecting all of the target fuel injection amount from the cylinder fuel injector 20 to directly feed it to the inside of the combustion chamber 11. Therefore, when the cooling water temperature TW is less than the second threshold value TW2, it is possible to enlarge the temperature region at which operation is possible in the HCCI mode, so it is possible to further improve the fuel efficiency and possible to suppress the amount of discharge of $NO_X$ or unburned HC to suppress more the deterioration of the exhaust emission.

Note that, if the engine operating state is in the self-ignition region RR, when the cooling water temperature TW becomes the second threshold value TW2 or more, it is necessary to switch the operating mode of the engine body 1 from the HCCI mode to the PPC mode and inject the entire target fuel injection amount from the cylinder fuel injector 20. For this reason, for smoothly performing the switch from the HCCI mode to the PPC mode, for example, as shown in the modification 1 of the present embodiment shown by the broken line in FIG. 11, in the HCCI mode, the injection ratio of the cylinder fuel injector 20 may be made to gradually rise from the optimal proportional injection ratio the higher the cooling water temperature TW from the cooling water temperature TW1 so that the injection ratio of the cylinder fuel injector 20 becomes 100% when the cooling water temperature becomes the second threshold value TW2.

Further, as in the modification 2 of the present embodiment shown by the one-dot chain line in FIG. 11, the target fuel injection amount is injected from the cylinder fuel injector 20 and the port fuel injector 25 by the optimal proportional injection ratio until the cooling water temperature TW becomes a predetermined third threshold value TW3 from the first threshold value TW1 to the second threshold value TW2. When the cooling water temperature TW becomes the third threshold value TW3 or more, it is also possible to gradually raise the injection ratio of the cylinder fuel injector 20 from the optimal proportional injection ratio the higher the cooling water temperature TW so that the injection ratio of the cylinder fuel injector 20 becomes 100% when the cooling water temperature becomes the second threshold value TW2.

According to the above explained present embodiment, the fuel feed system 2 is further configured to be able to indirectly feed fuel to the combustion chamber 11. The combustion control part of the electronic control unit 200 (control device) configured in the same way as the first embodiment is further configured so as to indirectly feed at least part of the fuel to the combustion chamber 11 during the intake stroke while directly feeding the remaining fuel to the combustion chamber 11 during the intake stroke to form a homogeneous premix when the temperature of the engine body 1 is less than the second threshold value TW2.

In this way, by indirectly feeding at least part of the fuel to the combustion chamber 11, it is possible to reduce the ratio of fuel deposited as drops of fuel on the inside wall surfaces of the combustion chamber 11 etc., so it is possible to reduce more the PN in the exhaust.

Further, the fuel can be made to vaporize before the fuel is fed into the combustion chamber 11, so it is possible to suppress the drop in cylinder temperature due to the latent heat of vaporization. For this reason, the first threshold value TW1 can be lowered. Therefore, when the cooling water temperature TW is less than the second threshold value TW2, it is possible to enlarge the temperature region enabling operation in the HCCI mode, so it is possible to further improve the fuel efficiency and it is possible to suppress the amount of discharge of $NO_X$ or unburned HC to further suppress deterioration of the exhaust emissions.

Further, if, like in the modifications of the present embodiment, the temperature of the engine body 1 is the first threshold value TW1 to less than the second threshold value TW2, when the temperature of the engine body 1 is high, compared to when it is low, the combustion control part may be configured so as to increase the ratio of the fuel directly fed to a combustion chamber 11.

Due to this, it is possible to smoothly switch from the HCCI mode to the PPC mode.

Above, embodiments of the present disclosure were explained, but the above embodiments just show some of the examples of application of the present disclosure. The technical scope of the present disclosure is not limited to the specific constitutions of the above embodiments.

The invention claimed is:

1. A control device for an internal combustion engine for controlling an internal combustion engine provided with:
    an engine body;
    a fuel feed system configured to directly feed fuel to a combustion chamber of the engine body and to indirectly feed fuel to the combustion chamber of the engine;
    a spark plug arranged so as to face the inside of the combustion chamber; and
    a temperature detector configured to detect a temperature of the engine body,
    which control device is comprised of a combustion control part configured to burn a premix by controlling the fuel feed system and the spark plug as necessary based on the temperature of the engine body in an operating region enabling the premix to be burned by compression ignition inside the combustion chamber,
    wherein the combustion control part is configured:
    to feed fuel to the combustion chamber in the intake stroke to form a homogeneous premix and make the homogeneous premix burn by flame propagation when the temperature of the engine body is less than a first threshold value;
    to feed fuel to the combustion chamber in the intake stroke to form a homogeneous premix and make the homogeneous premix burn by compression ignition when the temperature of the engine body is the first threshold value to less than a second threshold value larger than the first threshold value;
    to directly feed fuel to the combustion chamber in the compression stroke to form a partial premix and make the partial premix burn by compression ignition when the temperature of the engine body is the second threshold value or more; and
    to indirectly feed at least part of the fuel to the combustion chamber in the intake stroke while directly feeding the remaining fuel to the combustion chamber in the intake stroke to form a homogeneous premix when the temperature of the engine body is less than the second threshold value.

2. The control device for an internal combustion engine according to claim 1, wherein the combustion control part is further configured so as to raise the ratio of the fuel directly fed to the combustion chamber when the temperature of the engine body is high compared to when it is low when the temperature of the engine body is the first threshold value to less than the second threshold value.

3. The control device for an internal combustion engine according to claim 1, wherein
    the combustion control part further comprises a first threshold value calculation part configured so as to calculate the first threshold value based on an estimated value of cylinder temperature at compression top dead center in the case of assuming the premix is adiabatically compressed inside the combustion chamber, and
    the first threshold value calculation part is configured so as to reduce the first threshold value the higher the estimated value of the cylinder temperature.

4. The control device for an internal combustion engine according to claim 2, wherein
    the combustion control part further comprises a first threshold value calculation part configured so as to calculate the first threshold value based on an estimated value of cylinder temperature at compression top dead center in the case of assuming the premix is adiabatically compressed inside the combustion chamber, and
    the first threshold value calculation part is configured so as to reduce the first threshold value the higher the estimated value of the cylinder temperature.

5. The control device for an internal combustion engine according to claim 1, wherein the combustion control part is an electronic control unit.

6. The control device for an internal combustion engine according to claim 2, wherein the combustion control part is an electronic control unit.

7. The control device for an internal combustion engine according to claim 3, wherein the combustion control part and the first threshold value calculation part are an electronic control unit.

8. The control device for an internal combustion engine according to claim 4, wherein the combustion control part and the first threshold value calculation part are an electronic control unit.

9. The control device for an internal combustion engine according to claim 1, wherein the temperature detector is a temperature sensor.

* * * * *